March 12, 1968  J. J. QUACKENBUSH ET AL  3,372,971
OPTICAL SYSTEM AND MATERIALS
Filed Dec. 28, 1964
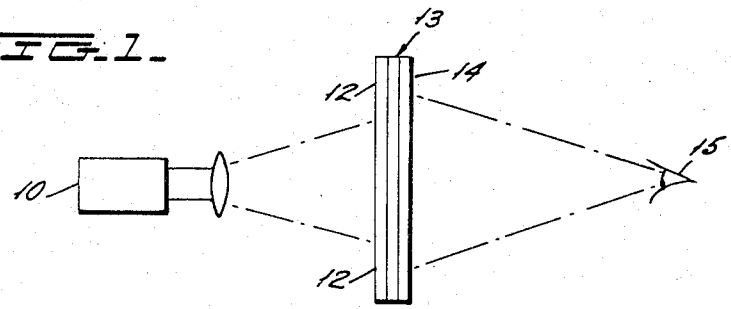
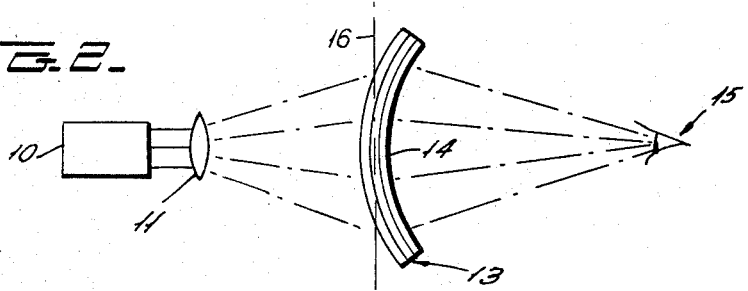
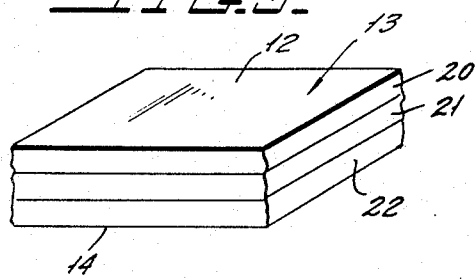
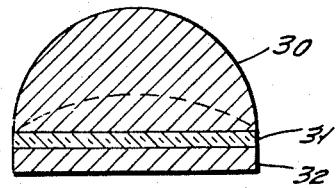
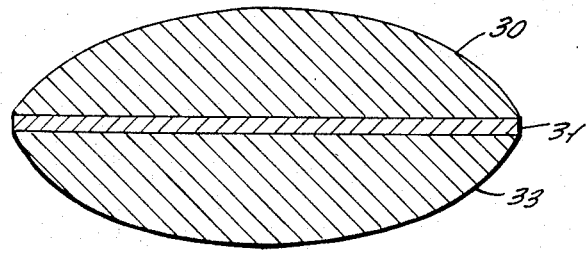
JOHN J. QUACKENBUSH
HERBERT O. CORBETT
INVENTOR.
BY United States Patent Office 3,372,971
Patented Mar. 12, 1968

3,372,971
OPTICAL SYSTEM AND MATERIALS
John J. Quackenbush, Monroe, and Herbert O. Corbett, Bridgeport, Conn., assignors to National Distillers and Chemical Corporation, New York, N.Y., a corporation of Virginia
Filed Dec. 28, 1964, Ser. No. 421,227
7 Claims. (Cl. 350—117)

ABSTRACT OF THE DISCLOSURE

A projection screen and projection system in which the projection screen is flexible and formed of two or more extruded layers of plastic material which are intimately bonded to one another along their adjacent surfaces. One layer is composed of a mixture of polyethylene and polypropylene, while the other is composed of a copolymer of polyethylene and polypropylene with the total screen thickness being about 100 mils. An excellent image from the projector is formed on the surface of the screen remote from the projector, while a poor image is developed on the front surface of the screen. The screen can be formed of three layers of plastic material, each having a thickness of 30 mils, where the two outer layers may be of the same material.

This invention relates to optical materials and systems, more particularly relates to a novel extruded plastic sheet structure for use in optical systems.

This invention is based upon the discovery of unusual and, as yet unexplained, optical characteristics of plastic sheets, including their ability to diffuse light, formed of at least one or two or more layers of plastic material laminated to one another without the presence of an intermediate bonding material or air.

Accordingly, a primary object of this invention is to provide a novel optical material.

A further object of this invention is to provide a novel light-reflecting and light diffusing system.

Yet another object of this invention is to provide a novel projection screen.

A still further object of this invention is to provide a novel back-lighting projection system.

A further object of this invention is to provide a novel optical medium composed of a plurality of intimately laminated plastic sheets.

Yet another object of this invention is to provide a novel projection screen wherein a substantial portion of the incident light intensity is diffused from the rear of the screen.

Yet another object of this invention is to provide a novel screen which is back-lighted by a projector and which provides an extremely clear image on the surface opposite the projector.

Yet another object of this invention is to provide a novel light screen which is flexible.

A still further object of this invention is to provide a novel optical material that does not exhibit chromatic aberration.

A still further object of this invention is to provide a novel extrudable or moldable optical material.

Yet another object of this invention is to provide a projection screen which is inexpensive.

Still another object of this invention is to provide a novel use as an optical material for a waste product in a plastic film extruding process.

A still further object of this invention is to provide a novel projection screen which exhibits a three-dimensional effect.

Still another object of this invention is to provide a novel extruded anamorphic lens structure of crystalline thermoplastics whereby the crystalline structure serves as a large number of individual, controlled prismatic lenses and/or light scattering centers.

Yet another object of this invention is to provide a novel screen structure having a controlled and infinite lens aspect ratio.

These and other objects of this invention will become apparent from the following description when taken in connection with the drawings, in which:

FIGURE 1 schematically illustrates a back-lighted projection system constructed in accordance with the invention.

FIGURE 2 illustrates the manner in which the novel screen can be curved to exhibit a three-dimensional characteristic.

FIGURE 3 is an enlarged perspective view of a sheet of material broken away which is constructed in accordance with the present invention.

FIGURE 4 illustrates a cross-sectional view of the manner in which a lens can be formed of the material of the present invention.

FIGURE 5 illustrates a reversing lens formed in accordance with the invention.

The novel optical material of the present invention was discovered when attempting to find a use for the waste product of a film extruding process. The plastic film-extruding industry uses many techniques well known to those skilled in the art for the extrusion of plastic film. Many of these techniques cause a waste product which often can be reused. For example, when extruding large sheets of very thin materials, the material sheets go through a phase in which the sheet edges are trimmed. The trim material is then remelted and reused in the extrusion process. This trim material can be reused since the sheet from which it is trimmed is of a uniform material. For example, if the sheet being extruded is of polyethylene material, the trim is uniformly polyethylene and, therefore, can be returned to the extruder apparatus to be reused.

The film industry, however, is turning more and more to the use of laminated products wherein plastic materials of diverse chemical composition, or similar materials of diverse properties, are laminated together. For examples of laminated structures, reference is made to copending application Serial No. 350,220, filed March 9, 1964, in the name of Corbett, and assigned to the assignee of the instant invention.

Thus, it is common to provide a laminated product consisting of one or more layers of polyethylene sandwiched between one or more layers of polypropylene. When this laminated structure is made in sheet form and the edges trimmed therefrom, the trim material is not formed of a uniform chemical composition. Thus, the trim cannot be returned to either the polyethylene extruder or polypropylene extruder feeding the lamination die since it is a composition of materials that would contaminate the mix of the extruder to which it is added. This has become a very serious problem, since this trim material is now waste and has been susceptible of no useful application in the film extrusion process. Thus, the material which has a cost of the order of thirteen cents a pound must now be disposed of as a waste product for the order of six to seven cents per pound, the material being used as a cheap material for injection molding applications where little quality control is needed.

In order to provide another use for this material, we performed many experiments to see if it could be used as some type of extruded product. One of these attempts was to extrude a relatively thick sheet of the order of 100 mils thick which was composed of an inner layer of this waste material along with outer layers of relatively virgin product; specifically, a copolymer of polypropylene and polyethylene.

The results of this experiment were disappointing since the laminated sheets which were drawn in accordance with the teachings of the above noted copending application Serial No. 350,220 were cloudy in appearance, and the layers could be peeled apart as contrasted to the rigid adhesion normally obtained between laminates. We were about to abandon the attempt to use such a product as a plastic sheeting when it occurred to us that the product could serve as a photographic screen.

Accordingly, we set up a projector and a slide and projected an image on this screen in a darkened room. For some reason, we were unable to obtain a clear or focused image on the surface upon which we were projecting, and the intensity of the image was quite low. Thinking that this occurred because the image was incorrectly focused, we walked to the sheet and began to adjust its position, attempting to obtain a better image. At this time, we looked at the back of the screen and found that at the back of the screen there existed an extremely clear and bright image of the slide being projected. That is to say, while the screen surface facing the projector showed a dim, unfocused image, the opposite side of the screen showed an extremely bright and sharply focused image.

We could not then, and still are unable to explain the reasons for this extremely odd behavior. We then made further tests, and found still further unexplained phenomena occurring with this screen. For example, since the film is relatively flexible, we were able to curve the screen in an arc covering 180°, and found that we still had a completely focused image on the back surface of the screen.

These results were, and still are, wholly unexplained. We have reason to believe, however, that the crystallinity of the material serves to act as a large number of oriented prisms or light scattering centers which in some manner cause the appearance of a clear image on the reverse side of the screen. This apparently acts in combination with the use of diverse laminated materials having an intimate bond between them which provides a plurality of parallel reflection boundaries.

Notwithstanding the fact that these results were, and still are unexplained, the product which we discovered is an exceptionally effective photographic screen which is far superior to any type of back-lighted screen known to the art.

Such back-lighted screens are commonly formed of ground glass sheets which, of course, are not flexible, and are difficult to form to predetermined shapes. When the structure of the present invention is used as a back-lighted screen, it has the apparent advantages over the usual ground glass screen of flexibility, and further has been found to have improved clarity and intensity as contrasted to presently used screens.

When one layer was stripped away from the three-ply laminate and replaced without its intimate bond, a marked decrease in available light intensity at the emergent side was noted. Thus, when plural layers are used, the intimate bond makes an important contribution to image brightness.

The flexibility of the screen, as indicated above, permits one to bend the screen around approximately 180°, and to place one's eyes approximately at the center of curvature of the screen. When this is done, astounding three-dimensional results are achieved.

It is believed that the intimate bonding between at least two film layers of material which have been drawn to preserve their crystallinity plays an important part in the operation of the screen. To this end, it is possible to extrude lens-shaped structures in the laminated process wherein the laminated layers of material serve a lens function either for a screen structure or for an optical lens per se.

The use of the novel structure in a back-lighted system is schematically illustrated in FIGURE 1 wherein a suitable projector 10, which may be a still projector or motion picture projector, or any other type of image projecting apparatus, is provided with a standard suitably adjustable focusing lens 11 with the image focused upon the left-hand side 12 of the screen 13. The observer then observes the right-hand side 14 of screen 13, as schematically illustrated, by observer 15.

The screen 13 in FIGURE 1 is shown of exaggerated thickness, but will have a thickness which could, for example, be of the order of 100 mils.

The sheets which have been experimented with have had a surface area of the order of 3 feet by 3 feet. This provides a relatively flexible screen which, however, has sufficient rigidity to be self-supporting.

As previously indicated, the image appearing on side 12 of screen 13 is an out-of-focus image of low intensity which cannot be focused, regardless of the adjustment made in the projector 10 and its lens system 11. The surface 14, however, projects an exceptionally clear and bright image which can be observed by the observer 15.

As shown in FIGURE 2, which is similar to FIGURE 1 except that the screen 13 has been curved, it has been found that even when the screen is curved as illustrated in FIGURE 2, with experiments having the sheet curved to an arc of the order of 180°, the image on surface 12 is still unfocused and dim, while the image on surface 14 is extremely sharp, notwithstanding the fact that certain portions of the screen have been distorted.

By way of example, in FIGURE 2, the focal plane of the lens 11 can be considered to be the dot-dash line 16. It will be observed that the upper and lower regions of screen 13 are distorted out of this focal plane 16. Notwithstanding this fact, the image portion at these outer regions is found to be fairly clear and undistorted with its intensity somewhat diminished from that existing when the complete screen lies in the focal plane 16.

Note that in FIGURE 2, a suitable support means can be provided for the sheet 13 to hold it in a predetermined or adjustable curvature.

With the arrangement of FIGURE 2, it was also found that startling three-dimensional effects are obtained. It is not fully known at the present time whether these three-dimensional effects are obtained because of the psychological effects due to peripheral vision, or whether there is some separation of the images within the various reflecting planes of the screen 13. Observation, however, has indicated that brightly illuminated portions of the image projected by projector 10 seem to come out of the image on surface 14 and stand very clearly away from the remaining portion of the image. This would seem to indicate that peripheral vision effects alone are not responsible entirely for the very pronounced three-dimensional effects obtained from the invention.

In the screen of FIGURE 2, the screen has been curved only in a single plane. It will, however, be apparent that since the screen material is formed of a flexible material, the material could be flexed to have a three-dimensional convex shape away from the observer to further enhance the three-dimensional effects to be obtained.

A section of the screen 13 of FIGURE 1 is illustrated in FIGURE 3 as having three layers 20, 21 and 22. Each of layers 20, 21 and 22 are of the order of 30 mils thick to give a total sheet thickness of the order of 90 mils. These dimensions can vary considerably, and while at least two layers should be provided, any number of layers will still provide the unusual results of the invention within the limits of experimentation presently completed.

The two outer layers 20 and 22 were formed of a copolymer of polypropylene and polyethylene which contained from 5 to 15% of polyethylene. The central layer 21 was composed of what was formerly a waste product composed of the trim of a laminated film having a central polypropylene layer and outer polyethylene layers. Within the trim material there was from 2 to 4% by weight of polypropylene having a density in the range of 0.86 to 0.91 gram per cubic centimeter. The index of refraction of this material is approximately 1.49.

The polyethylene portion of this mix occupied from 96 to 98% by weight, and has a density in the range of 0.925 to 0.935 gram per cubic centimeter. The index of refraction of the polyethylene portion of the mix is of the order of 1.52.

In drawing the sheet product of FIGURE 3, the laminated flow techniques of application Serial No. 350,220 were incorporated in order to obtain an intimate bond between the interfaces of layers 20, 21 and 22. It is believed that this intimate bond is responsible to a large degree for the unusual optical effects observed for this material.

It was previously mentioned that the crystallinity of the various layers are believed to play an important role in obtaining the optical effects described herein. The crystallinity of the various layers in FIGURE 3 are those obtained by extruding the material and subjecting the material to a cooling cycle such that the extruded sheet was cooled approximately 450° F. per minute. More specifically, in drawing the sheet of FIGURE 3, the extrusion rate was of the order of 15 feet per minute from the die with this material being led to cooling rolls in the usual manner. The temperature of the material exiting from the die was of the order of 375° F., while the temperature of the cooling rolls, which may be spaced from 1 inch to 6 inches from the discharge orifice was approximately 80° F. Thus, a cooling rate of the order of 450° F. per minute was used. Note that different cooling rates will cause different crystalline formations in the material. This, however, will not substantially affect the novel optical properties discovered which are the subject of the present invention.

In the embodiment of FIGURES 1, 2 and 3, the structure is a completely planar structure. However, the structure with its extremely unusual characteristics can also be used in the formation of various types of lenses.

By way of example, FIGURE 4 illustrates an extruded ribbon, in cross-section, of a lens formed of three layers 30, 31 and 32 of materials equivalent to that used in layers 20, 21 and 22, respectively, of FIGURE 3. In this arrangement, the bottom layer 32 has a thickness of the order of 30 mils, while the central layer has a thickness of the order of 20 mils. The outer layer 30 is then designed to have an arcuate radius which could be of the order of 1 inch. After this lens has been extruded, it is clear that it can be cut in sections of varying length.

Its operation will be similar to that previously described for sheet 13 of FIGURES 1, 2 and 3, this result apparently being obtained because of the avoidance of an interfering air media or other bonding medium between layers 30, 31 and 32 apparently in combination with the crystalline structure of the various materials.

FIGURE 5 illustrates a further embodiment of the invention similar to FIGURE 4 wherein the bottom layer 32 of FIGURE 4 is replaced by a curved section 33 which is similar to the upper layer 30. Here, again, the unusual results of the invention are obtained.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiment of the invention in which an exclusive privilege or property is claimed are defined as follows:

1. A flexible, translucent, rear-viewing projection screen; said screen comprising at least first and second layers of a first and second extrudable plastic material; said first and second layers being of substantially uniform thickness and being intimately bonded to one another between their interfaces; one of said layers being composed of a mixture of polyethylene and polypropylene and the other layer being composed of a copolymer of polyethylene and polypropylene.

2. A flexible, translucent, rear-viewing projection screen as set forth in claim 1 wherein each of said layers has a thickness on the order of 30 mils.

3. A flexible, translucent, rear-viewing projection screen as set forth in claim 1 wherein said screen is arcuate in cross section.

4. A flexible, translucent, rear-viewing projection screen; said projection screen comprising at least first, second and third layers of extrudable plastic material; said first and third layers being bonded in intimate contact with respective opposite surfaces of said second layer; said first, second and third layers having a substantially uniform thickness; said first and third layers being composed of a copolymer of polyethylene and polyproylene; and said second layer being composed of a mixture of polyethylene and polypropylene.

5. A flexible, translucent, rear-viewing projection screen as set forth in claim 4 wherein each of said layers has a thickness on the order of 30 mils.

6. A flexible, translucent, rear-viewing projection screen as set forth in claim 4 wherein said screen is arcuate in cross section.

7. In a projection system; an image projector and a flexible, translucent, rear-viewing screen positioned in the focal plane of said image; said screen comprising at least first and second layers of a first and second extrudable plastic material; said layers being of uniform thickness and intimately bonded to one another between their interfaces; one of said layers being composed of a mixture of polyethylene and polypropylene; the other of said layers being composed of a copolymer of polyethylene and polypropylene; the image projected from said projector being sharply developed on the surface of said screen remote from said projector and poorly developed on the opposite surface of said screen.

References Cited

UNITED STATES PATENTS

| 1,262,511 | 4/1918 | Kelly | 88—24 |
| 2,352,101 | 6/1944 | Hutter | 88—24 |
| 2,368,099 | 1/1945 | Bodde | 350—117 |

FOREIGN PATENTS

| 1,252,668 | 12/1945 | France. |

JULIA E. COINER, *Primary Examiner.*